May 28, 1968 M. H. CROTHERS 3,386,045

INTERSTAGE COUPLING TRANSFORMERS FOR SEMI-CONDUCTOR DEVICES

Filed Aug. 10, 1964

INVENTOR.
MILTON H. CROTHERS

BY William R Jacox

ATTORNEY

United States Patent Office 3,386,045
Patented May 28, 1968

3,386,045

INTERSTAGE COUPLING TRANSFORMERS FOR SEMI-CONDUCTOR DEVICES

Milton H. Crothers, Urbana, Ill., assignor of one-half to William R. Jacox, Dayton, Ohio Filed Aug. 10, 1964, Ser. No. 388,355
4 Claims. (Cl. 330—21)

ABSTRACT OF THE DISCLOSURE

An improved transformer coupling network for coupling two stages of semi-conductor devices such as transistors. The primary winding of the transformer is connected between one terminal of the source potential and the output electrode and the secondary winding of the transformer is connected between said output electrode and a reference potential. A tap on the secondary winding is connected to the input circuit of the following stage.

*Background of the invention*

Good interstage coupling means connected between a driving stage and a driven stage in transistor circuitry should have each and all of the following characteristics:

(1) The interstage coupling means should provide coupling of the alternating current signals between stages over the desired frequency range.

(2) The interstage coupling means should isolate the quiescent direct current voltages at the input and output portions of the coupling means.

(3) The interstage coupling means should provide a D-C quiescent current in the output portion of the driving stage.

(4) The interstage coupling means should provide a direct current bias path in the input portion of the driven stage.

(5) The interstage coupling means should provide impedance matching between stages.

Every conventional interstage coupling network used in transistor circuitry has one or more of these characteristics and performs one or more of the functions outlined above. However, prior to this invention, no known interstage coupling network has provided all of the desired features or characteristics. For example, one of the most commonly used interstage coupling networks is a resistance-capacitor type of interstage coupling network. However, a resistance-capacitor type of interstage coupling network does not provide impedance matching between stages. On the other hand, satisfactory impedance matching may be obtained by interstage transformer coupling. However, when transformer coupling is employed, problems arise in obtaining good frequency response and in biasing.

Thus, it is an object of this invention to provide an interstage coupling transformer for transistor circuitry in which the interstage coupling transformer contains all of the desired features and characteristics listed above.

It is another object of this invention to provide such an interstage coupling transformer which can be produced in small physical size at relatively low cost and which is long-lived.

Other objects and advantages reside in the construction of parts, the combination thereof, the method of manufacture, and the mode of operation, as will become more apparent from the following description.

Figure 1:
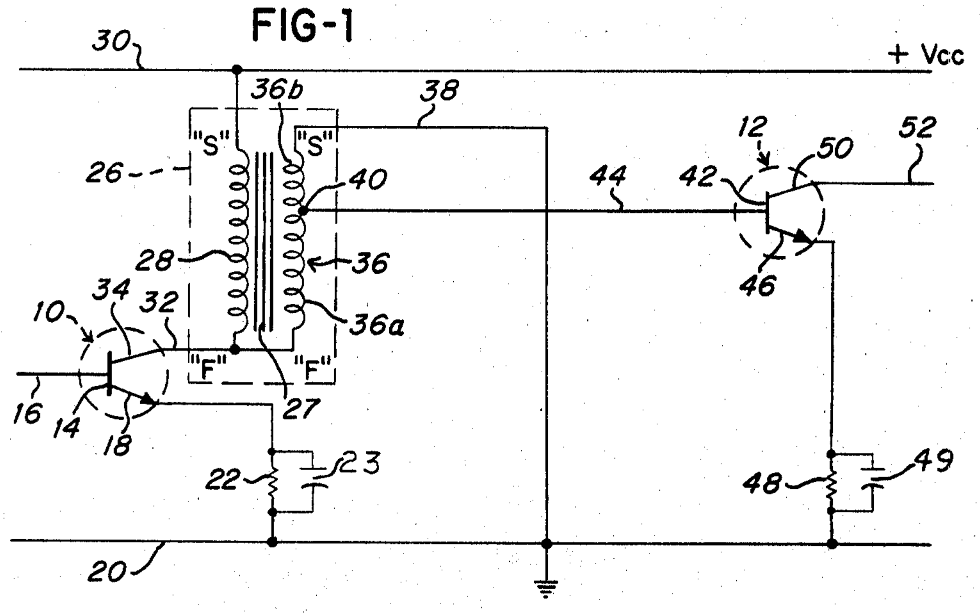
FIGURE 1 is a schematic wiring diagram showing an interstage coupling transformer of this invention associated with transistor circuitry.

Referring to the drawings in detail, FIGURE 1 shows a transistor 10 and a transistor 12. The transistor 10 has a base 14 connected to an input conductor 16. An emitter 18 of the transistor 10 is joined to a conductor 20 which is shown as being grounded. Herein a resistive element 22 and a capacitive element 23 are shown in the circuit between the emitter 18 and the conductor 20.

An interstage coupling transformer 26 of this invention joins the transistor 10 to the transistor 12.

The coupling transformer 26 has a magnetizable core 27 upon which is wound a primary winding 28 which has one end thereof connected to a collector voltage supply lead 30 and the other end thereof joined to a conductor 32, the conductor 32 being connected to a collector 34 of the transistor 10.

The transformer 26 also has a secondary winding 36 wound upon the core 27. The winding 36 has one end thereof joined to the winding 28. The other end of the winding 36 is connected by means of a lead 38 to the grounded conductor 20.

As shown, the windings 28 and 36 are wound in the same sense or are wound in the same direction upon the core 27, the start S of each winding 28 and 36 being shown at the upper part of the core 27 and the finish F of each winding 28 and 36 being shown at the lower portion of the core 27.

Intermediate the ends of the winding 36 is a tap 40 which is connected to a base 42 of the transistor 12 by means of a conductor 44. Thus, the winding 36 has a portion **36*a* and a portion 36*b***.

The transistor 12 has an emitter 46 which is joined to the conductor 20. A resistive element 48 and a capacitive element 49 are shown in the circuit between the emitter 46 and the conductor 20. The transistor 12 has a collector 50 connected to an output lead 52.

The windings 28 and 36 are so wound that the winding portion **36*b* has the proper number of turns with respect to the number of turns of the winding 28 to provide good impedance matching between the high impedance collector circuit of the transistor 10 and the low impedance base circuit of the transistor 12. The winding portion 36*a* has a proper number of turns which, when added to the turns of the portion 36*b*, provide the necessary voltage gradient between the two ends of the winding 36 so that application of a given value of voltage across the winding 28 results in induction of substantially the same value of voltage across the winding 36**.

Figure 2:
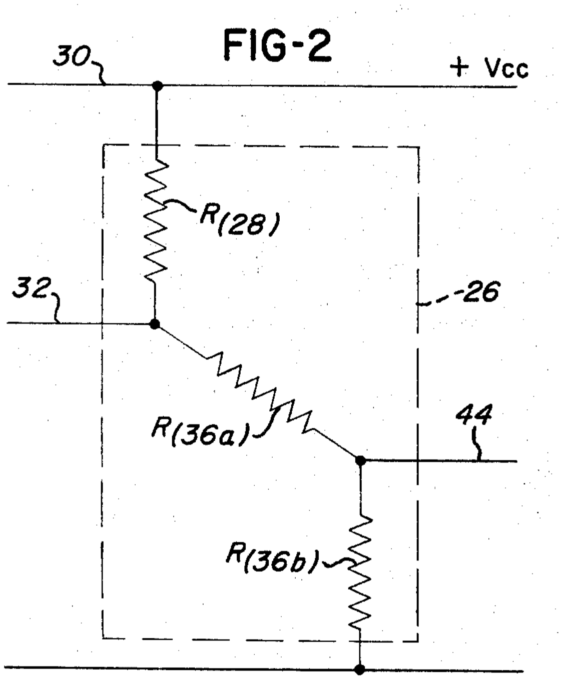
FIGURE 2 shows a direct current equivalent circuit of the interstage coupling transformer of FIGURE 1.

FIGURE 2 shows a direct current equivalent circuit of the interstage coupling transformer 26. This direct current equivalent circuit illustrates the resistance paths provided by the winding 28 and by the winding portions **36*a* and 36*b*. The direct current resistance value of each of these windings is selected to provide the desired bias voltage to the base 42 of the transistor 12 while also applying desired direct current voltage to the collector 34 of the transistor 10**.

Thus, the transformer windings 28 and 36 provide means for impedance matching between stages of the circuitry while also providing a path for the D-C quiescent current is the output stage of the transistor 10 and a path for direct current bias to the input of the transistor 12. The coupling transformer 26 also provides means which couple the alternating current signals for flow from the transistor 10 to the transistor 12.

Thus, it is understood that the interstage coupling transformer of this invention provides all of the desired characteristics for interstage coupling means in transistor circuitry.

The drawings show the interstage coupling transformer of this invention in use with NPN transistors. However, of course, the interstage coupling transformer may also be used with PNP transistors.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. In combination in electrical circuitry,
a first transistor provided with a base, a collector, and an emitter,
a second transistor provided with a base, a collector, and an emitter,
circuit means joining the emitter of the first transistor to the emitter of the second transistor,
a source of collector voltage,
a coupling transformer provided with a primary winding having a first terminal, the first terminal being joined to the source of collector voltage, the primary winding also having a second terminal, the second terminal being joined to the collector of the first transistor,
the coupling transformer also having a secondary winding, the secondary winding having a first terminal, means joining the first terminal to said circuit means which joins the emitter of the first transistor to the emitter of the second transistor, the secondary winding also having a second terminal, the second terminal of the secondary winding being joined to the second terminal of the primary winding,
the secondary winding having a tap intermediate the terminals thereof, the tap being connected to the base of the second transistor, the tap dividing the secondary winding into a first portion and a second portion, the resistance value of the primary winding and the resistance values of the portions of the secondary winding being such that desired direct current paths are provided to the transistors,
the first portion of the secondary winding being between the tap thereof and the first terminal of the secondary winding, the number of turns in the first portion of the secondary winding being in a ratio with respect to the turns of the primary winding for desired impendance matching between the first transistor and the second transistor,
the total number of turns of the primary winding with respect to the total number of turns of the secondary winding being in a ratio to provide substantially the same value of volts per turn in the primary winding and in the secondary winding.

2. An interstage coupling transformer for transistor circuitry comprising:
a magnetizable core,
a first winding wound upon the core,
a second winding wound upon the core,
one end of the first winding being joined to one end of the second winding,
the juncture of the first and second windings being adapted to be connected to the output of a stage of transistor circuitry,
the first and second windings having substantially an equal number of turns,
the second winding having an intermediate connection which divides the second winding into a first portion and a second portion, the second portion of the second winding being adjacent the end thereof which is joined to the first winding,
the intermediate connection of the second winding being adapted to be joined to an input of another stage of the transistor circuitry,
the first portion of the second winding having a number of turns with respect to the number of turns of the first winding so that there is impedance matching between the output of the first said stage and the input of said other stage of the transistor circuitry,
the first winding and the second portion of the second winding and the first portion of the second winding having given resistance values to provide predetermined potentials of unidirectional current to said stages of the transistor circuitry during operation thereof when connected to said windings.

3. Interstage coupling apparatus for use in electrical circuitry provided with transistors comprising:
a transformer having a first winding and a second winding, means connecting one end of the second winding to one end of the first winding,
the second winding having a portion spaced from said one end thereof, said portion of the second winding being provided with a given number of turns with respect to the number of turns of the first winding to provide impedance matching between transistors connected thereto,
the resistance values of the windings of the transformer being of given values to provide predetermined resistance paths to transistors connected thereto.

4. An interstage coupling transformer for electrical circuitry provided with a plurality of stages of solid state devices comprising:
a first winding,
a second winding,
the windings being wound in the same direction upon a common core, each winding having a start end and a finish end, the same end of each of the windings being connected together by a common connection,
the second winding having a first portion and a second portion, the second portion of the second winding being adjacent said common connection which connects the windings together,
the first portion of the second winding having a given number of turns, the first winding having a number of turns with respect to the given number of turns of the first portion of the second winding to provide impedance matching between two stages of solid state devices of the electrical circuitry,
the second winding having a total number of turns which is substantially equal to the total number of turns of the first winding,
the resistance values of the first winding and of the portions of the second winding being predetermined to provide desired direct current resistance paths.

References Cited

UNITED STATES PATENTS

| | | | |
|---|---|---|---|
| 2,018,545 | 10/1935 | Case | 336—150 X |
| 2,325,936 | 8/1943 | Blume. | |
| 2,449,029 | 9/1948 | Wean et al. | 336—150 X |
| 2,728,052 | 12/1955 | Van Duyne | 333—78 |
| 2,843,822 | 7/1958 | Scott | 336—150 X |
| 2,845,497 | 7/1958 | Barron et al. | 330—21 X |

ROY LAKE, *Primary Examiner.*

NATHAN KAUFMAN, *Examiner.*